UNITED STATES PATENT OFFICE 2,542,783

EMULSIONS OF ETHYLENE POLYMERS AND INTERPOLYMERS AND PROCESS OF MAKING SAME

Leslie Seed, Northwich, England, assignor to Imperial Chemical Industries Limited, a corporation of Great Britain No Drawing. Application April 7, 1949, Serial No. 86,127. In Great Britain April 16, 1948

10 Claims. (Cl. 260—29.6)

This invention relates to a new process for the manufacture of emulsions.

It is known that solid ethylene polymers can be converted into aqueous dispersions thereof from pulverulent or friable polythene, water and a dispersing agent. However, such a process is a complicated one because it involves making the polymer, subjecting it to a disintegrating process, and then emulsifying it.

It is also known that aqueous emulsions of solid ethylene polymers can be obtained by polymerising ethylene in presence of an emulsifying agent and a percompound, especially a persulphate. These processes involve polymerisation at high pressures and at temperatures such as 40°–120° C., and although the emulsions so obtained can be used for coating textiles and other materials the coatings so obtained are not flexible enough for most purposes and the polymers are of poor mechanical properties and poor flow characteristics. This is especially so with polymers made in the presence of persulphate catalysts.

Emulsions of solid ethylene polymers can be made with catalysts other than persulphate catalysts, in presence of an emulsifying agent, but polymer quality is poor when the polymerisation is carried out below 120° C., and the emulsion is either not formed or not stable when the polymerisation is carried out at higher temperatures in order to improve the physical characteristics of the polymer.

The object of the present invention is to obtain an aqueous emulsion of solid ethylene polymers directly by polymerisation, the polymers having the high strength and flexibility currently associated with commercially available polythenes. A further object is to obtain a high yield of good quality emulsion of solid ethylene polymers.

We have found that high yields of high quality emulsions of ethylene polymers can be obtained when polymerisation is carried out in presence of both an ionic emulsifying agent and a water-soluble salt of a carboxylic acid polymer of molecular weight above 300. With this combination we can not only prepare emulsions at temperatures above the softening points of the polymers and thus get good quality polymers, but the emulsions have increased resistance to creaming during storage.

According to the present invention, we manufacture aqueous emulsions of solid ethylene polymers and interpolymers by a process which comprises polymerising ethylene, alone or together with interpolymerising constituents, at a high temperature and pressure, in presence of water, a water-soluble salt of a carboxylic acid polymer of molecular weight above 300, and an organic sulphonic acid or a derivative thereof.

The process is carried out at a high temperature, particularly between 50° and 400° C., but we prefer to work at between 120° and 250° C. in order to get the best polymers. It is also carried out at a high pressure generally exceeding 200 atmospheres, preferably 800–2000 atmospheres or higher. The emulsifying agents are generally used as an aqueous solution containing between 0.1 and 5%, and preferably between 1 and 3%, by weight of the water-soluble salt of a carboxylic acid polymer of molecular weight above 300; and between 0.3 and 3%, and preferably between 0.8 and 2%, by weight of the organic sulphonic acid or derivative thereof. Inorganic salts such as sodium sulphate may be present if desired.

In a typical method of carrying out the process, distilled water, the dispersing agents, the polymerisation catalyst and any other additive such as an inorganic salt or second component in an interpolymer, are added to a suitable stirred pressure vessel which is then closed. Air is removed by evacuation or by purging with ethylene, and the required quantity of compressed ethylene admitted. The sealed vessel is then heated to the required temperature until the polymerisation is at an end, which may be judged by the tendency of the pressure in the vessel to stop falling. Ethylene is continuously or intermittently added to the vessel to maintain the desired reaction pressure during the course of the polymerisation. At the end of the polymerisation the vessel is cooled and opened to atmosphere, the ethylene being bled off and the aqueous emulsion of polymer run from the vessel.

The process may be carried out in presence of an ethylene polymerisation catalyst such as oxygen, a peroxy compound particularly alkyl peroxides, or an azo compound. It can also be carried out in absence of a catalyst, especially at the higher pressures and temperatures such as 200°–300° C. and 1500–2000 atmospheres. Interpolymerising constituents include substances having a carbon-carbon double bond, carbon monoxide, formaldehyde and hydrogen. The process is not affected by the presence of small proportions of inert organic solvents such as benzene.

The process can readily be carried out in a continuous manner. One method of continuous operation involves introducing ethylene, and an aqueous medium containing the water-soluble salt of a carboxylic acid polymer of molecular weight above 300 and the organic sulphonic acid or derivative thereof, continuously into a reaction vessel under high pressure. The vessel is kept at a high temperature, if necessary by applying heat through the walls, and the emulsion so produced is continuously withdrawn from the vessel together with unconverted ethylene. The unconverted ethylene is separated from the emulsion containing the solid polymers of ethylene and may be reintroduced into the reaction vessel together with fresh ethylene. If desired, a polymerisation catalyst can be introduced also; for example, oxygen catalyst can be mixed with the ethylene or injected into the aqueous medium, or peroxide or other catalysts can be dispersed or dissolved in the aqueous medium. For such a continuous process we may use a stirred reaction vessel or a tubular reaction vessel.

In the water-soluble salt of a carboxylic acid polymer, it is not necessary to have regular or recurring groups of the carboxylic acid radicle, but there must be three or more and preferably at least 10 carboxylic acid radicles in the molecule, joined, if desired, through an organic residue. Thus, we may use ammonium or alkali metal salts of acid polymers such as polymethacrylic acid and polyacrylic acid; saponified interpolymers of maleic anhydride with other vinyl compounds such as ethylene. We may also use hydroxy carboxylic acid derivatives of high molecular weight polyhydroxy compounds, such as glycollic acid ethers of water-soluble cellulose or of polyvinyl alcohol; and dicarboxlyic acid or anhydride condensation products with low molecular weight polyhydroxy compounds, such as the condensation products of maleic and phthalic anhydrides, or ricinoleic acid, with glycerol, pentaerythritol, or ethylene glycol. The salt used has a molecular weight above 300 and is preferably an alkali metal or ammonium salt. Of the above substances we prefer the ammonium salt of polymethacrylic acid, the sodium and ammonium salts of a saponified ethylene/maleic anhydride interpolymer, and the water-soluble alkali metal salts of a glycollic acid ether of celluose.

Organic sulphonic acid derivatives are compounds having the formula $R.SO_3M$, where M is a metallic or similar radicle and R is an organic radicle including the radicle $R'O—$. Examples of such compounds are sodium oleo-p-anisidide sulphonate, calcium stearo-p-anisidide sulphonate, sodium dioctyl sulphosuccinate, p-stearamido benzene sulphonic acid, sodium methyl stearamido ethane $\beta$ sulphonate, sodium cetyl benzene sulphonate, sodium dodecyl benzene sulphonate, sodium cetyl sulphate, ammonium oleyl sulphate, triethanolammonium lauryl sulphate, sodium methyl oleate sulphonate, and potassium stearophenone sulphonate. Of these we prefer the sodium salt of oleo-p-anisidide sulphonate, as stable emulsions of satisfactory particle size range and of high polymer content are most easily obtained with this substance.

The emulsions obtained are highly stable and may be used in conventional coating and other operations. There is no need to adopt the frequently practised habit of adding a thickening agent, because the stability of the emulsion is already high enough. The dispersions may also, if desired, be used for making powdered ethylene polymers and interpolymers by precipitation from the emulsion by conventional means. They also serve as adhesives for fabrics and are useful for all purposes for which polythene dispersions have already been described, with the added advantage that the materials obtained with the present dispersions are tougher and more flexible.

The invention is illustrated but not restricted by the following examples, all parts being by weight.

*Example 1*

To a suitable stirred pressure vessel are added 160 parts of water, 2.6 parts of sodium oleyl p-anisidide sulphonate, 0.27 part of the ammonium salt of a polymethacrylic acid containing more than 45 carbon atoms, and 1 part of a 5% benzene solution of di-t-butyl peroxide. The oxygen is then removed from the vessel by repeated flushing with oxygen-free ethylene, and 69.6 parts of oxygen-free ethylene are added to the charge.

The vessel is then maintained at 200° C. and 1200 atmospheres internal pressure for 10 minutes. The course of the reaction may be followed by the tendency of the internal pressure to fall and a further 16 parts of ethylene are added to maintain this pressure. When no further pressure drop occurs, the vessel is cooled and the contents discharged into a suitable collecting vessel where the liquid is separated from the unreacted gas.

The residual liquid, comprising 160 parts, is a smooth white aqueous dispersion of polyethylene which remains stable for 3 days. It may be split by treatment with 500 parts of acetone and the polymer filtered off. After careful washing with 8000 parts of distilled water and 800 parts of boiling ethanol followed by drying in vacuo at 60° C., 27 parts of solid ethylene polymer are obtained. This polymer is tough and flexible and melts at between 107° and 117.5° C., and possesses a molecular weight of 17,100 as determined by the solution viscosity in tetralin at 75° C.

For comparison, if the sodium oleyl p-anisidide sulphonate be omitted no dispersion but only fused polymer is obtained, whereas if the ammonium salt of polymethacrylic acid be omitted a course flocculate results which splits into two phases in 50 minutes and has a semi-solid surface cream in 3 days.

*Example 2*

In a similar manner to that of Example 1 the charge consists of 160 parts of water, 2.6 parts of sodium oleyl-p-anisidide sulphonate, 8 parts of the ammonium salt of a saponified ethylene/maleic anhydride interpolymer containing more than 54 carbon atoms, 1 part of a 5% benzene solution of di-t-butyl peroxide and 70 parts of ethylene. A further 16.4 parts of ethylene are added during polymerisation at 200° C. to maintain the pressure at 1200 atmospheres.

In this case the product is a fine white fluid dispersion containing 19% by weight of solid ethylene polymer with a molecular weight 20,500. The polymer fuses completely at 152° C. and possesses a tensile strength of 136 Kg./cm.$^2$ at 400% extension. The dispersion shows slight phase separation after 3½ hours but remains fully mobile and fluid for more than 3 days.

*Example 3*

The ammonium salt of the maleic anhydride/ethylene interpolymer used in Example 2 is replaced by the sodium salt in the same concentration. In this case 15.6 parts of ethylene are added during the reaction to maintain the internal pressure and the resulting dispersion contains 19% by weight of solid polyethylene which is completely molten at 132° C., breaks at a tension of 116 kg./cm.$^2$ and an extension of 420%, and possesses a molecular weight of 19,100. The dispersion shows a tendency to phase separation after 50 minutes but remains fully fluid for more than 3 days, whereas a comparable experiment without the sodium salt of the maleic anhydride/ethylene interpolymer gives a dispersion which has solidified after 3 days, and without the sodium salt of the sulphonic acid derivative no dispersion is obtained.

*Example 4*

In a similar manner the pressure vessel is charged with 160 parts of water, 1.6 parts of sodium oleyl p-anisidide sulphonate, 3.2 parts of the water-soluble sodium salt resulting from the reaction of a small proportion of the free hydroxyl groups of cellulose with chloracetic acid, 0.2 part of azodicyclohexanecarbonitrile, and 70 parts of ethylene.

The reaction is maintained at 120° C. and 800 atmospheres pressure for 3½ hours during which time a further 16.4 parts of ethylene are added.

The resulting product is a smooth white thick creamy fluid which maintains its uniform consistency unchanged for longer than 28 days. It contains 18.5% by weight of solid polyethylene. The polymer has a molecular weight of 17,600, breaks under a tension of 155 kg./cm.$^2$ and begins to soften at 117° C.

*Example 5*

When the charge to the vessel of the previous examples is altered to 80 parts of water, 0.8 part of sodium oleyl p-anisidide sulphonate, 1.1 parts of the ammonium salt of a polymethacrylic acid containing more than 45 carbon atoms, and 110 parts of ethylene containing 800 parts per million of oxygen, it is necessary over 4½ hours at 220° C. to inject a further 6 parts of ethylene to maintain the pressure at 1700 atmospheres. The product is a white dispersion showing slight phase separation after 90 minutes and contains 16.5% by weight of ethylene polymer having a molecular weight of 23,600.

*Example 6*

Similarly, the charge is 160 parts of water, 1.6 parts of the sodium salt of oleyl p-anisidide sulphonic acid, 3.2 parts of the water-soluble sodium salt of a glycollic acid ether derivative of cellulose, 0.4 part of a 5% benzene solution of di-t-butyl peroxide, and 82 parts of oxygen-free ethylene. The vessel is maintained at 150° C. and 2000 atmospheres for 3½ hours, during which time a further 12 parts of ethylene are injected.

The dispersion contains 18% by weight of solid polymer which has not softened at 150° C. It has a tensile strength of 175 kg./cm.$^2$ at 400% extension and a molecular weight of 27,000. The dispersion shows a slight phase separation after 4 hours but is still mobile and fluid after 12 days.

Having now particularly described and ascertained the nature of our said invention and in what manner the same is to be performed, we declare that what we claim is:

1. Process for the manufacture of improved aqueous emulsions of solid ethylene polymers which comprises polymerising ethylene at a high temperature and pressure, in the presence of water, a water-soluble salt of a carboxylic acid polymer of molecular weight above 300, and an organic sulphonic compound of the formula R.SO$_3$M, where M is a radical of the group consisting of hydrogen, ammonium, quaternary ammonium, alkali metal and alkaline earth metal.

2. Process as claimed in claim 1 in which the organic sulphonic compound is sodium oleyl p-anisidide sulphonate.

3. Process as claimed in claim 1 carried out at a temperature between 120° and 250° C.

4. Process as claimed in claim 1 carried out at a pressure between 800 and 2000 atmospheres.

5. Process as claimed in claim 1 in which the water-soluble salt of a carboxylic acid polymer is an ammonium salt of polymethacrylic acid.

6. Process as claimed in claim 1 carried out in a continuous manner by introducing ethylene, and an aqueous medium containing a water-soluble salt of a carboxylic acid polymer of molecular weight about 300 and an organic sulphonic compound of the formula R.SO$_3$M, where M is a radical of the group consisting of hydrogen, ammonium, quaternary ammonium, alkali metal and alkaline earth metal, continuously into a reaction vessel which is maintained at a high temperature and pressure, and continuously withdrawing the emulsion and unconverted ethylene.

7. Aqueous emulsions of solid ethylene polymers whenever obtained by the process of claim 1.

8. Process as claimed in claim 1 in which the water-soluble salt of a carboxylic acid polymer is an alkali metal salt of a glycollic acid ether of cellulose.

9. Process for the manufacture of improved aqueous emulsions of solid ethylene polymers which comprises polymerizing ethylene together with an interpolymerizing constituent at a high temperature and pressure in the presence of water, a water-soluble salt of a carboxylic acid polymer of molecular weight above 300, and an organic sulphonic compound of the formula R.SO$_3$M, where M is a radical of the group consisting of hydrogen, ammonium, quaternary ammonium, alkali metal and alkaline earth metal.

10. Process for the manufacture of improved aqueous emulsions of solid ethylene polymers which comprises polymerizing ethylene alone at a temperature between 120° and 250° C., at a pressure between 800 and 2000 atmospheres, in the presence of water, a water-soluble salt of polymethacrylic acid, and sodium oleyl p-anisidide sulphonate.

LESLIE SEED.

REFERENCES CITED

The following references are of record in the file of this patent:

UNITED STATES PATENTS

| Number | Name | Date |
| --- | --- | --- |
| 2,133,257 | Strain | Oct. 11, 1938 |
| 2,279,436 | Berg | Apr. 14, 1942 |
| 2,342,400 | Hopff et al. | Feb. 22, 1944 |
| 2,449,489 | Larson | Sept. 14, 1948 |
| 2,485,270 | Folt | Oct. 18, 1949 |